United States Patent [19]

Mayeaux et al.

[11] Patent Number: 5,161,107
[45] Date of Patent: Nov. 3, 1992

[54] TRAFFIC SURVEILLANCE SYSTEM

[75] Inventors: Paul H. Mayeaux; Virgil O. Stamps, both of Houston, Tex.

[73] Assignee: Mestech Creation Corporation, Houston, Tex.

[21] Appl. No.: 603,179

[22] Filed: Oct. 25, 1990

[51] Int. Cl.⁵ .............................. G06F 15/70
[52] U.S. Cl. ............................. 364/436; 340/937; 382/18
[58] Field of Search ........... 340/937; 364/436, 424.01; 382/18

[56] References Cited

U.S. PATENT DOCUMENTS

| | | | |
|---|---|---|---|
| 3,663,937 | 5/1922 | Bolner | 340/937 |
| 3,668,625 | 6/1972 | Blank et al. | |
| 3,930,735 | 1/1976 | Kerr | 340/937 |
| 4,214,265 | 7/1986 | Olesen | 358/93 |
| 4,433,325 | 2/1984 | Tanaka et al. | 340/937 |
| 4,490,851 | 12/1984 | Gerhart et al. | 382/43 |
| 4,709,264 | 11/1987 | Tamura et al. | 358/93 |
| 4,847,772 | 7/1989 | Michalopoulos | 364/436 |

OTHER PUBLICATIONS

White, Ken W., "Computer Vision on the Highway".
Michalopoulos, Panos G. "Automated Extraction of Traffic Parameters Through Video Image Processing".
Visual Sense Systems, AUTOSCOPE Brochure.
Dozier, Jeff; Goetz; Alexander O., Technical Support Package for High-Resolution Imaging Spectometer; Mar. 1990.
Bak, David J. *Design News* "Stack-Based Processor Speeds Target Recognition"; Sep. 4, 1989.
Perceptics Corporation, Data Sheet of Model IP921 Image Processor; Sep. 1989.
Landeta, David; Malinowski, Chris; Olmstead, Clay; "Signal Processing Using RTX Processors and DSP Accelerator ICs", *Electronic Engineering*, Jun. 1989.
Computer Recognition Systems, Data Sheet on Traffic Analysis System.
Sensors, data sheet on the TC 20 Vechicle Detector.

*Primary Examiner*—Thomas G. Black
*Attorney, Agent, or Firm*—Browning, Bushman, Anderson & Brookhart

[57] ABSTRACT

A machine vision system for detecting and recognizing objects. The system includes a camera which forms three different images of the object using different portions of the electromagnetic spectrum and uses these different images depending on the time of day and weather conditions. The machine vision system also enables an operator to select zones within the camera's field of view than may be of any size or shape. The machine vision system only detects objects in the specified zones. The vision system provides signals to a traffic light controller to provide vehicle or object presence indications for traffic signal sequencing purposes. The vision system can simply detect an object or optionally can pattern match for specific objects.

31 Claims, 8 Drawing Sheets

TRAFFIC SURVEILLANCE SYSTEM

BACKGROUND OF THE INVENTION

1. Field of the Invention

The present invention relates to a machine vision system for detecting and recognizing objects, and more particularly to a machine vision system that is preferably used in traffic surveillance which enables an operator to select variably sized zones to be monitored and can detect vehicles at night and in all weather conditions.

2. Description of the Prior Art

Advanced traffic surveillance and control continues to be a major area of research. One principal area of research in traffic surveillance is that of vehicle detection. Classically, inductive loops located at strategic locations in the roadway have been used for vehicle detection. However, there are numerous problems with inductive loops, including sensitivity and the need to install them in the roadway, which are well known. In one manner improvement over loops, video cameras have been used as a more viable way to achieve vehicle detection. However, systems which employ video cameras generally require a human operator to interpret the images generated by the camera and are therefore undesirable because of the staffing and communication costs.

An alternative way to interpret video images that has recently been developed is through image processing or "machine vision." This technique uses a computer and software to analyze the roadway images the information needed for traffic surveillance and control. In spite of major efforts to develop a machine vision system for traffic surveillance and control, a workable device having the capabilities and performance required for practical applications has been elusive. The principal problems that have been encountered with machine vision systems for traffic surveillance have been (1) reliable operation under various weather and traffic conditions, (2) the arbitrary placement of multiple detection points in any configuration anywhere within the camera's field of vision, (3) automatic adaptation to a wide variety of roadway backgrounds, and (4) distinguishing between various objects such as cars, trucks, pedestrians or other objects.

As mentioned above, a problem that has been encountered in traffic monitoring and surveillance systems is the operability of the system under various weather and traffic conditions and at night. Many detection systems that use standard video cameras encounter problems when weather conditions become onerous and vision is blurred or at night when vision is reduced. Therefore, a traffic monitoring system is desired which can operate under all weather and traffic conditions.

One traffic surveillance system that has recently been developed employs machine vision for traffic detection, surveillance and control. This system is referred to as AutoScope and was developed at the University of Minnesota. The AutoScope vehicle detection system can detect traffic in a number of horizontal zones within the camera's field of view. An operator can specify these zones using interactive graphics by placing vertical detection lines along or across the roadway lanes on a television monitor displaying the traffic scene. The detection lines are placed vertically the television monitor showing the representation of the roadway lanes. Once the detection lines have been set, the monitor can be removed from the system. Thereafter, every time a car crosses these detection lines, a detection signal is generated by the AutoScope device.

This method of determining locations or zone within the camera's field of view is somewhat inflexible because the zones are limited to the full vertical height of the camera's field of vision. As a result, the selected zones in this system generally contain a much larger area than is actually needed to detect a vehicle or object within the zone. The unnecessarily large zones required in this system increase the amount of image processing required. Also, this limitation in zone selection limits the number of positions in which the camera may be situated.

The AutoScope system works such that every time a car crosses the one of the selected zones, a detection signal is generated by the device. This detection signal is similar to that produced by the standard loop detectors. Therefore, the AutoScope system detects the presence or passage of an object through one of its zones. The AutoScope system does not distinguish between automobiles, trucks, pedestrians, or other objects that pass through its zone. However, in many instances it is desirable to record the number and types of vehicles which pass through a given intersection. Therefore, it is desirable for a traffic surveillance system to be able to recognize objects that pass through its various zones.

In addition, many of the proposed traffic surveillance systems are somewhat large and bulky and therefore are inconvenient to set up. Therefore, it is desirable for a machine vision system to be incorporated into a single, self-contained apparatus to provide for convenience and ease of use.

SUMMARY OF THE INVENTION

The present invention comprises a machine vision system for detecting and/or recognizing objects. The machine vision system is preferably used in traffic surveillance according to the preferred embodiment of the present invention, but the use of the present invention includes an improved method which enables it to detect objects during either daytime or nighttime and also during all weather conditions. The present invention also enables an operator to select zones of any size or shape in the camera's field of vision in which vehicle detection and/or recognition is to take place.

The present invention includes a sensing element or camera which is sensitive to electromagnetic (EM) radiation ranging from the ultraviolet light spectrum through the visible light spectrum to the infrared light spectrum. Each of these ranges are effective under differing atmospheric conditions and are used accordingly. The EM radiation reflected from the object or scene is passed through a multiple level bandpass filter which is used to create three images of the object or scene based on different portions of the EM spectrum. The images produced by the bandpass filter are based on EM radiation from the ultraviolet spectrum, the visible light spectrum, and the infrared spectrum. The EM radiation output from the filter is reflected onto a charge coupled device (CCD) grid which produces a corresponding analog representation of each of the images.

The three resulting images are based on respective portions of the frequency spectrum of EM radiation and carry different information about the object or scene. One of these analog images is then passed through an analog to digital (A/D) converter to produce a corresponding digital image. Image processing techniques are then applied to this digital image to extract information regarding the presence of objects within the selected zones in the camera's field of vision.

The system chooses which of the three images are to be used in the detection and/or recognition of objects depending on the time of day and weather conditions. During the daytime, the image generated from the EM radiation in the visible light spectrum is preferably used to detect objects. At night, the image generated from the infrared spectrum is preferably used for the detection of objects. When no object has been detected in any of the selected zones for a certain period of time, then the system switches to an image from a different portion of the EM spectrum in which to detect objects. This method allows the detection of objects in all weather conditions and at all times of the day.

The present invention enables an operator to select various zones within the camera's field of vision in which to perform object detection. According to the present invention, an operator can select any zone within the camera's field of vision without regard to vertical or horizontal restraints. An operator may also select various attributes that correspond to each selected zone which determine the sensitivity of object detection within the respective zone.

The machine vision system according to the present invention performs object detection only in each of the respective zones selected by the operator. The machine vision system extracts edge information from the entire image, performs data reduction to remove unwanted background data, and then uses a magnitude comparator to compare the edge values extracted from the image with a threshold value stored in a magnitude latch. The magnitude comparator and latch are microprocessor controlled, and the threshold value can be adjusted depending on operator selected parameters such as time-of-day, zone-type, or statistical response.

The output of the magnitude comparator is a yes/no bit for each of he respective pixels in the image, and these bits determine whether the edges in the image have a greater magnitude than the threshold value stored in the magnitude latch. The yes/no bits in each of the selected zones are summed by the microprocessor and then divided by the total number of pixels in the zone to determine the edge density of the current image within the zone. The current background edge density is then subtracted from the current image density to arrive at an object edge density. This object edge density is then compared with an operator programmable threshold value to determine if an object is present within the image. Alternatively, the resulting object data can be compared against various reference object images stored in the system memory to perform recognition of the object within the respective zone.

The machine vision system provides an output to a traffic light controller which changes the respective traffic light according to the presence or absence of a vehicle within the respective zone. The system may also provide output data regarding traffic flow, density, vehicle speed, the number of cars/trucks, etc. to a recording device, which can be used later to determine traffic flow patterns.

Therefore, the present invention performs detection of objects using three separate images formed from three portions of the EM radiation spectrum. This enables the apparatus to effectively perform image recognition and detection of objects in all weather conditions and at all times of the day or night. The present invention also includes a means for enabling an operator to select various zones in the camera's field of vision in which the image detection is to take place. This provides more flexibility and convenience in using the machine vision system. In addition, the present invention is comprised of a small self-contained apparatus which can be conveniently set up and provides ease of use.

BRIEF DESCRIPTION OF THE DRAWINGS

A better understanding of the invention can be obtained when the following detailed description of the preferred embodiment is considered in conjunction with the following drawings in which.

DETAILED DESCRIPTION OF THE PREFERRED EMBODIMENT

Figure 1:
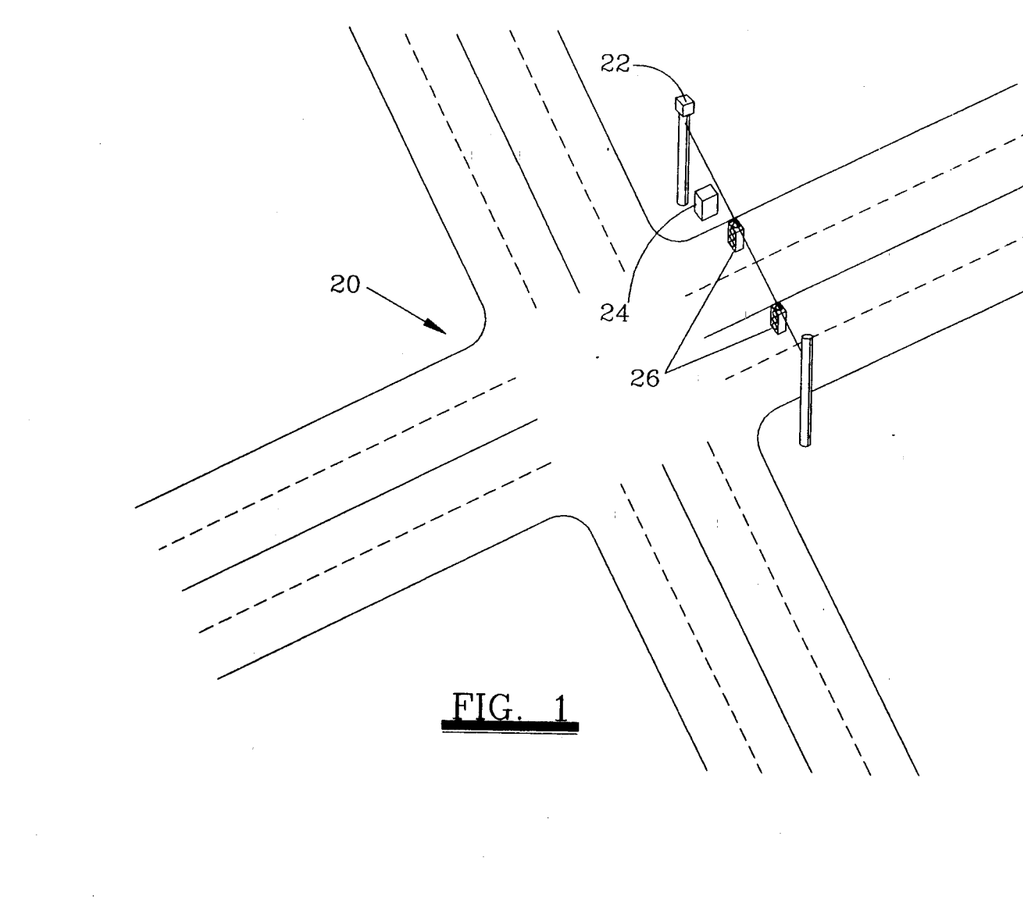
FIG. 1 is a perspective view of an intersection with a machine vision system according to the present invention installed.

The apparatus of the present invention is preferably used in traffic surveillance according to the preferred embodiment. However, the use of the present invention in other fields such as air traffic control and security surveillance is also contemplated. Referring now to FIG. 1, a roadway intersection 20 is shown. A machine vision system (MVS) 22 according to the present invention may be situated in any convenient location where it can view the desired portion of the intersection. Considerable flexibility is allowed in the placement of the MVS 22 because of the zone selection features of the present invention. In the present embodiment, the MVS 22 is preferably situated at a point overlooking a portion of the intersection 20. Multiple MVS units 22 may be installed to obtain complete coverage of the intersection, for example, in opposing corners.

The MVS 22 generates outputs indicating the presence or absence of vehicles in selected zones within the system's field of vision according to the preferred embodiment. The MVS 22 provides its output to a traffic controller 24 which controls the operation of traffic lights 26 within the intersection 20 and preferably changes the appropriate traffic lights 26 according to the output of the MVS 22. It should be noted that the MVS 22 need not be situated close to the controller 24, but only in a location where the desired roadway can be conveniently viewed.

Figure 2:
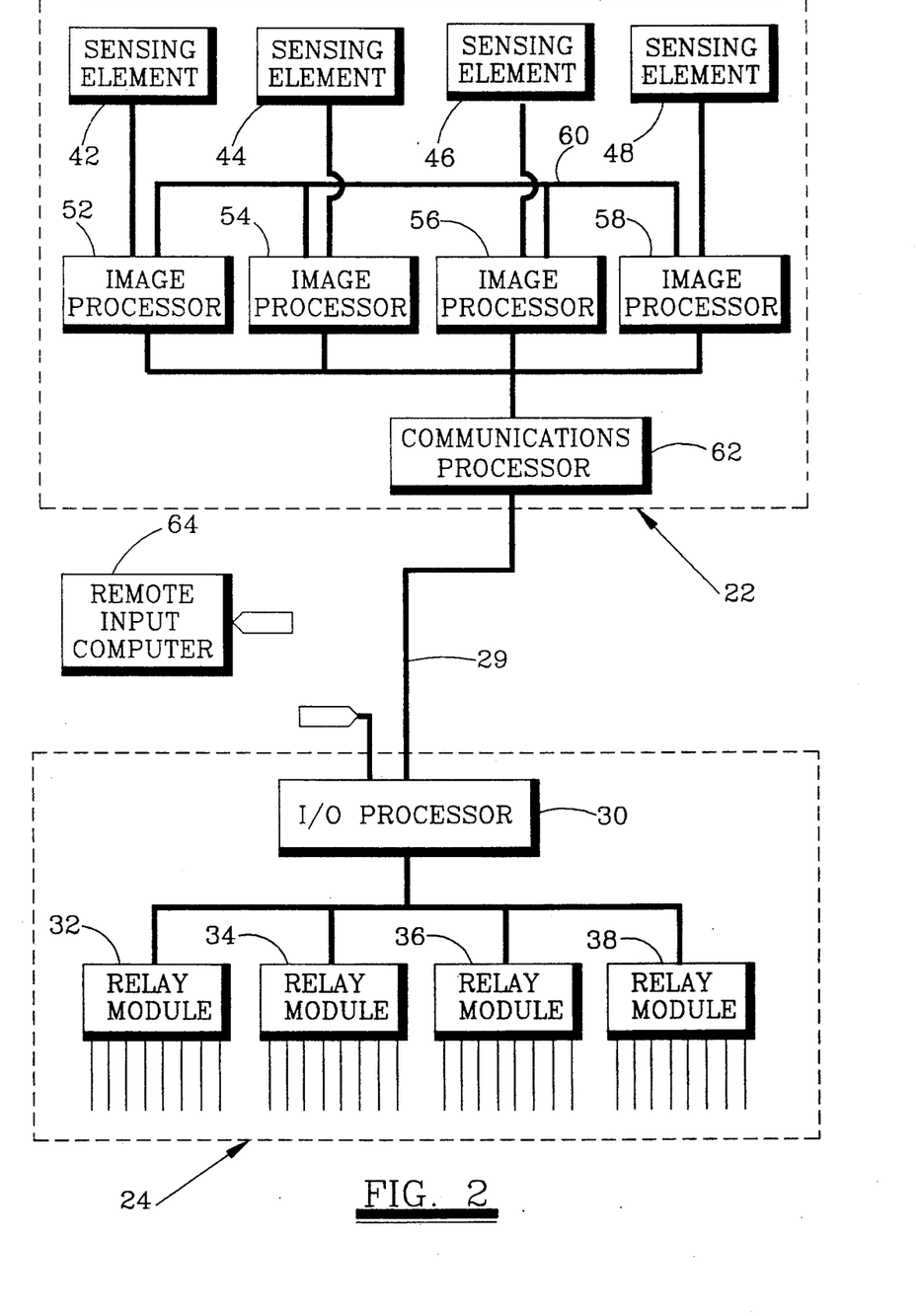
FIG. 2 is a block diagram of the machine vision system and traffic controller of FIG. 1.

Referring now to FIG. 2, a block diagram of the MVS 22 coupled to the controller 24 is generally shown. The MVS 22 is a relatively small, self-contained apparatus which includes all of the necessary elements to obtain an image, process the image to determine if an object is present, and generate a signal indicative thereof. The small size of the MVS 22 enables it to be easily installed in any convenient location. The MVS 22 may include any number of sensing elements or cameras. In the preferred embodiment, the MVS 22 includes four sensing elements 42, 44, 46, and 48. Four sensing elements are included in the MVS 22 to enable views of four different areas of the intersection 20. For example, each of the sensing elements 42, 44, 46, and 48 can be trained on four different areas of an intersection where vehicles would normally stop for a light. In the present embodiment, the sensing element 42 is preferably focused on the area of the intersection 20 opposite the traffic lights 26.

Each of the sensing elements 42, 44, 46 and 48 are sensitive to light ranging from ultraviolet to visible light and through near infrared to the far infrared spectrum. Therefore, each of the sensing elements 42, 44, 46, and 48 are sensitive to electromagnetic radiation ranging in wavelength from four nm to six nm. The sensing elements 42, 44, 46, and 48 preferably have a wide field of view in the present embodiment. In the present invention, an operator can select various zones in each of the sensing element's field of view in which image detection or recognition is to take place, as is described below. These zones would preferably correspond to lanes in the respective area of the roadway where traffic stops for a red light.

The output of each of the sensors 42, 44, 46, and 48 is provided to associated image processor logic 52, 54, 56, and 58, respectively. The image processors 52, 54, 56, and 58 operate on the respective image data produced by the associated sensing elements 42, 44, 46, and 48 and generate respective outputs to a communications processor 62. The image processors 52, 54, 56, and 58 are preferably coupled together through a data bus 60. Therefore, if one of the image processors 52, 54, 56, or 58 were not associated with a sensing element 42, 44, 46, or 48, then this image processor could perform overflow processing from an image processor that has an associated sensing element. In an alternate embodiment of the present invention, two or more image processors are associated with each sensing element, and data associated with selected zones in the sensing element's field of view are assigned to respective image processors to speed data throughput.

The communications processor 62 in the MVS 22 generates output signals that are transmitted to an I/O processor 30 located in the controller 24. The communications processor 62 preferably communicates with the controller 24 through a modulated high frequency carrier superimposed on the power source wiring 29. However, the use of other types of communication means is also contemplated. The I/O processor 30 receives the respective data and processes this data according to a respective traffic light algorithm. The traffic light algorithm utilizes the data regarding the presence or absence of vehicles in the roadway to change the traffic lights 26 accordingly. The I/O processor 30 transmits signal data reflecting the desired condition of the traffic lights 26 to relay modules 32, 34, 36 and 38. Relays in the respective relay modules 32, 34, 36, and 38 close according to the data received, and the closure of the respective relays in the relay modules 32, 34, 36, and 38 control the associated traffic lights 26. The closure of certain relays in the relay modules 32, 34, 36, and 38 may also provide information to a traffic control computer (not shown) which records traffic flow data such as vehicle counts, etc.

The I/O processor 30 includes an I/O port 40 which is used to receive input zone data regarding selected zones in which the MVS 22 is to detect objects or vehicles in its field of view, as is explained below. This input zone data is provided from a remote input computer 64 through the I/O processor 30 to the communication processor 62 and to the respective image processor 52, 54, 56, or 58.

Figure 3:
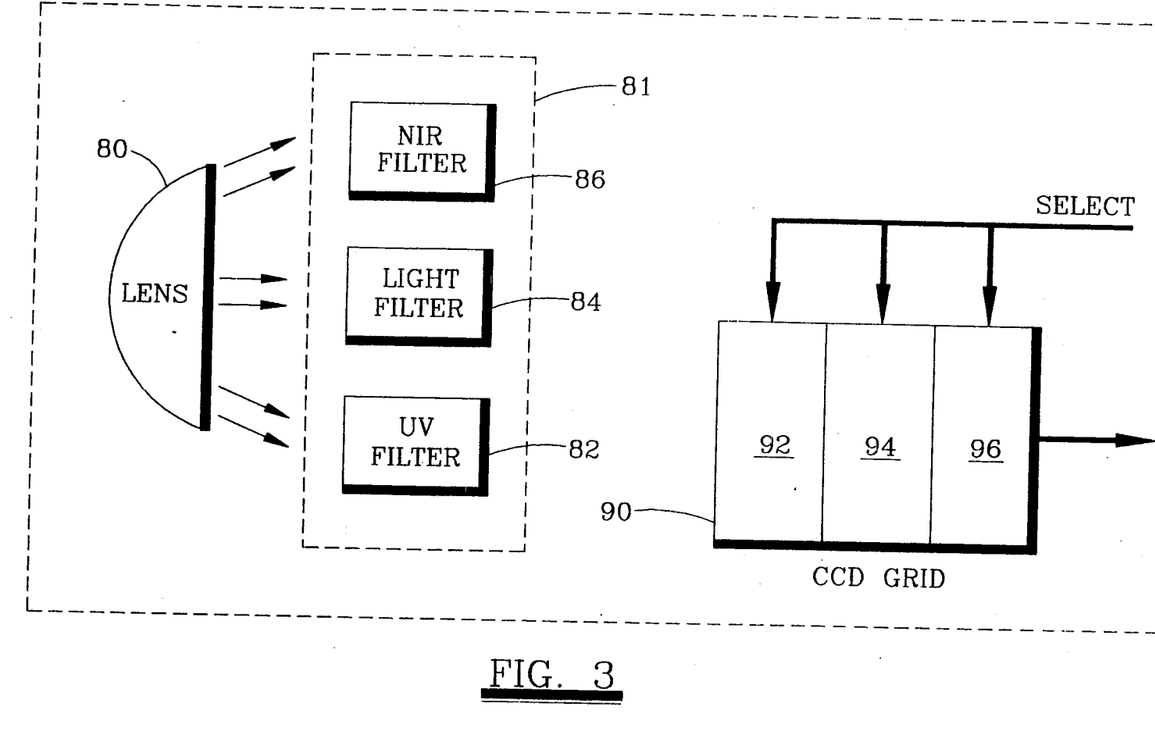
FIG. 3 is a block diagram of the sensing element of FIG. 2.

Referring now to FIG. 3, a more detailed block diagram illustrating the operation of the sensing elements 42, 44, 46, and 48 is generally shown. Because each of the sensing elements 42, 44, 46, and 48 and image processors 52, 54, 56, and 58 are similar in design and operation, the sensing element 42 and image processor 52 are described in the remainder of this description for simplicity. The sensing element 42 receives electromagnetic (EM) radiation in the ultraviolet to infrared frequency spectrum through a lens 80. The lens 80 provides this EM radiation to a multiple level bandpass filter 81 comprising three bandpass filters 82, 84 and 86. The bandpass filter 82 allows EM radiation in the ultraviolet spectrum to pass through and inhibits EM radiation at all other frequencies. The bandpass filter 84 allows EM radiation in the visible light spec rum to pass through and inhibits EM radiation at all other frequencies. The bandpass filter 86 allows EM radiation in the infrared spectrum to pass through and inhibits EM radiation at all other frequencies. Because the operation of bandpass filters is well known to those skilled in the art, details of their implementation are omitted for simplicity.

Figure 4:
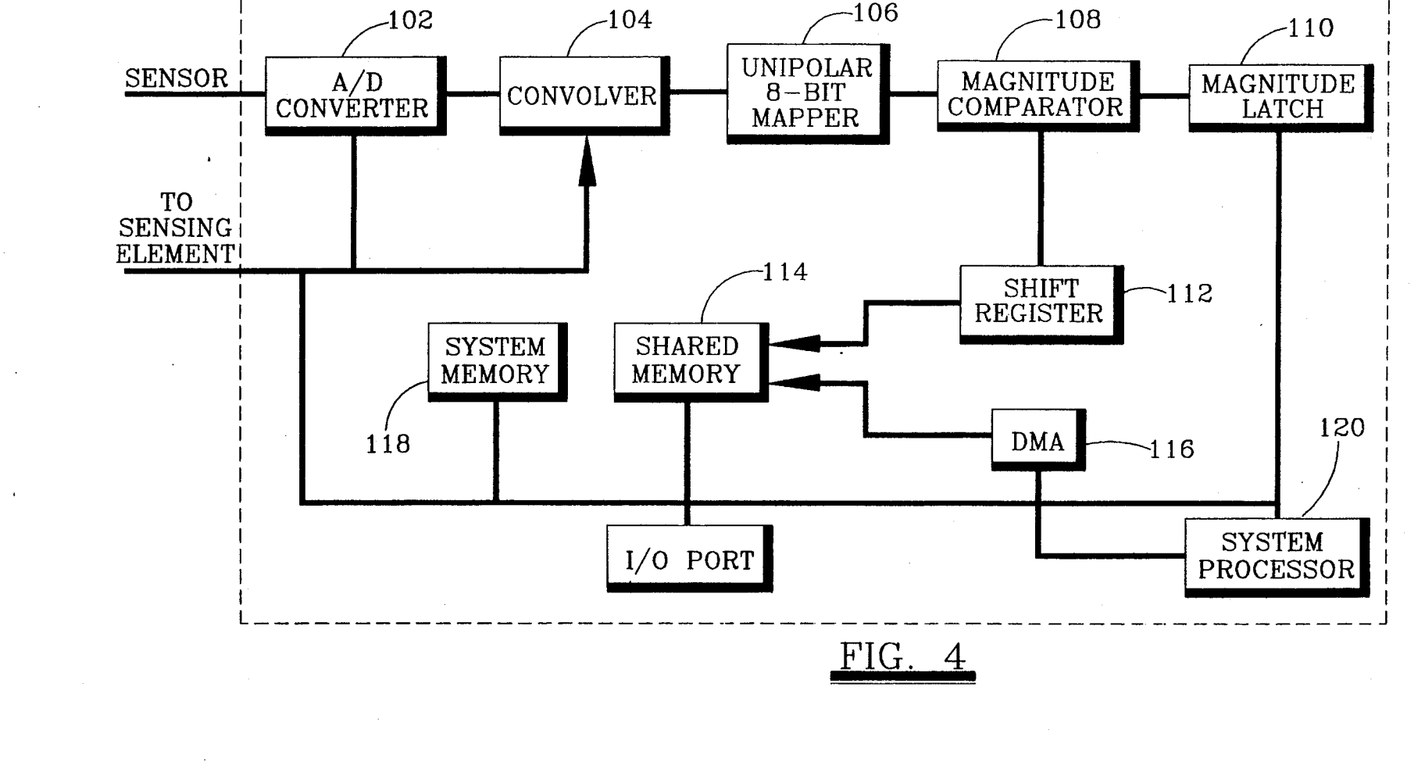
FIG. 4 is a schematic block diagram of the image processor of FIG. 2.

The filtered EM radiation from each of the band pass filters 82, 84, and 86 is supplied to a charge coupled device (CCD) grid 90 which is comprised of three different sections 92, 94, and 96 corresponding to each of the filters 82, 84, and 86, respectively. The EM radiation from each of the filters 82, 84, and 86 comes into contact with the respective sections 92, 94, and 96 of the CCD grid 90 and is transformed into a corresponding analog signal representing the intensity of the respective radiation at each particular point, thereby forming three distinct images. Because the operation of CCD grids is well-known to those skilled in the art, details of its implementation have been omitted for simplicity. The EM radiation from each of the filters 82, 84 and 86 generates images referred to as image 1, image 2, and image 3 in the respective sections 92, 94, and 96 of the CCD grid 90. The analog data representing one of the respective images is then output from the CCD grid 90 of the sensing element 42 to the image processor 52 (FIG. 4).

The image processing logic 52 includes a microprocessor, referred to as the system processor 120, that determines which of the respective images is provided from the CCD grid 90 to the image processing logic 52. Preferably, the system processor 120 is a very high performance processor having digital signal processing capabilities such as the RTX-2000 from Harris Semiconductor of Melbourne, Fla. The processor 120 generates a select signal to each portion 92, 94, and 96 of the CCD grid 90 that determines which image, image 1, image 2, or image 3, is to be provided to the image processing logic 52. Therefore, the processor 120 determines which of the images formed from the respective portions of the frequency spectrum is to be used to detect objects or vehicles in the sensing element's field of view.

The processor 120 includes an internal clock and determines which of the images are supplied to the image processing logic 52 depending in part on the time of day. During the daytime, the processor 120 preferably enables image 2 corresponding to the visible light spectrum to be supplied to the image processing logic 52. During the nighttime, the processor 120 preferably enables image 1 corresponding to the infrared spectrum to be supplied to the image processing logic 52. The processor 120 may also alternate between the images 1, 2, or 3, depending on visibility conditions, as explained below.

The analog data for a respective image received by the CCD grid 90 is provided to an analog to digital (A/D) converter 102, which converts the analog signals to corresponding digital signals. The analog signals are preferably output from the CCD grid 90 beginning with the upper left corner of the respective image. The A/D converter 102 preferably converts the respective analog image to a digital image comprising a number of individual pixels (picture elements). Each pixel in this newly formed digital image preferably comprises eight bits of intensity information, but the use of a different number of bits per pixel is also contemplated. Each of these pixels is assigned an effective address by the system processor 120, which provides frame start and pixel clocking information to the various portions of the image processing logic 52 for synchronization purposes.

The digital image formed by the A/D converter 102 is provided to convolver logic 104. The system processor 120 is coupled to the convolver logic 104, and the convolver logic 104 operates under control of the system processor 120. The convolver logic 104 preferably performs two-dimensional convolution algorithms on the input digital data to extract edge information from the image. The convolver logic 104 preferably uses the Laplacian operator for edge detection according to the preferred embodiment, but the use of any of the various edge detection or high pass filtering algorithms is also contemplated. It will be appreciated that these edge detection techniques may also be performed using discrete Fourier transform methods. The convolver logic 104 amplifies abrupt changes in the intensity of an image and removes all other information. Therefore, edges in the image are emphasized while the background is deemphasized or zeroed. The convolver logic 104 produces a digital output wherein each pixel is represented by a 12-bit signed integer. Preferably, the convolver logic 104 utilizes an HSP-48912 2-D convolver integrated circuit from Harris Semiconductor which is designed to cooperate with the RTX-2000.

The convolver logic 104 provides its output to a unipolar eight-bit mapper 106. The unipolar eight-bit mapper 106 performs data reduction and/or data compression techniques to remove or zero background image data and convert the remaining edge data to 8 bit per pixel data. The reduced image data is then provided to a magnitude comparator 108 one pixel or byte of data at a time beginning with the pixel in the upper left corner of the image, as controlled by the system processor 120. A magnitude latch 110 is connected to the magnitude comparator 108, and the latch 110 provides an eight-bit threshold value to the magnitude comparator 108. The system processor 120 is coupled to the magnitude latch 110 and controls the value held in the latch 110 that is provided to the comparator 108. The system processor 120 keeps track of the addresses of the pixels that are output by the mapper 106 to the comparator 108 in order to determine if the respective pixel is located in one of the selected zones. The system processor 120 uses operator selected zone parameters to determine which of the various pixel addresses are located in the respective operator selected zones, as is explained below.

The threshold value provided by the magnitude latch 110 is selected by the operator through software and can have different values for different zones selected by the operator, as is explained below. The processor 120 may also adjust the threshold level held in the magnitude latch 110 depending upon the time of day and an average statistical response of the respective zone in the image. The average statistical response of the zone is developed from the average number of pixel values greater than the threshold value for a respective zone over a period of time.

The magnitude comparator 108 compares the threshold value in the magnitude latch 110 with each eight-bit pixel value output from the eight-bit mapper 106. If the pixel image value output from the eight-bit mapper 106 is greater than the respective threshold value held in the magnitude latch 110, then the magnitude comparator 108 generates a one value for that respective pixel. If the pixel value output from the mapper 106 is less than the value held in the magnitude latch 110, then the magnitude comparator 108 generates a zero value for that respective pixel. Therefore, the magnitude comparator 108 determines if the respective edges output from the mapper 106 for a selected zone are sufficient to qualify as an image, depending on the respective threshold value held in the magnitude latch 110 for that zone.

The magnitude comparator 108 outputs a one-bit value for each respective eight-bit pixel generator by the mapper 106. This one-bit serial data stream is provided to a serial in, parallel out shift register 112. The shift register 112 provides the 8-bit parallel output to a shared memory 114. The shift register 112 generates its output to the shared memory 114 under the control of a direct memory access (DMA) address generator 116. The DMA address generator 116 is coupled to the system processor 120 and generates the respective addresses to sequentially store the data from the shift register 112 into shared memory 114. The resulting image that is stored in shared memory 114 is referred to as the edge extracted image for clarity.

Each of the above elements are under control of the system processor 120 and are synchronized by the system processor 120. As noted, the system processor 120 is preferably an RTX-2000 16-bit microprocessor which offers real time signal processing capabilities. However, the use of any of the various types of microprocessors is also contemplated. Once the edge extracted image data has been stored in the shared memory 114, the system processor 120 can analyze the operator selected zones in the edge extracted image to determined the presence of objects within the selected zones. In the present embodiment, if an object is determined to be in a respective zone, the system processor 120 generates a signal to the communications processor 62 which provides this information to the I/O processor 30, as was described above.

Figure 5:
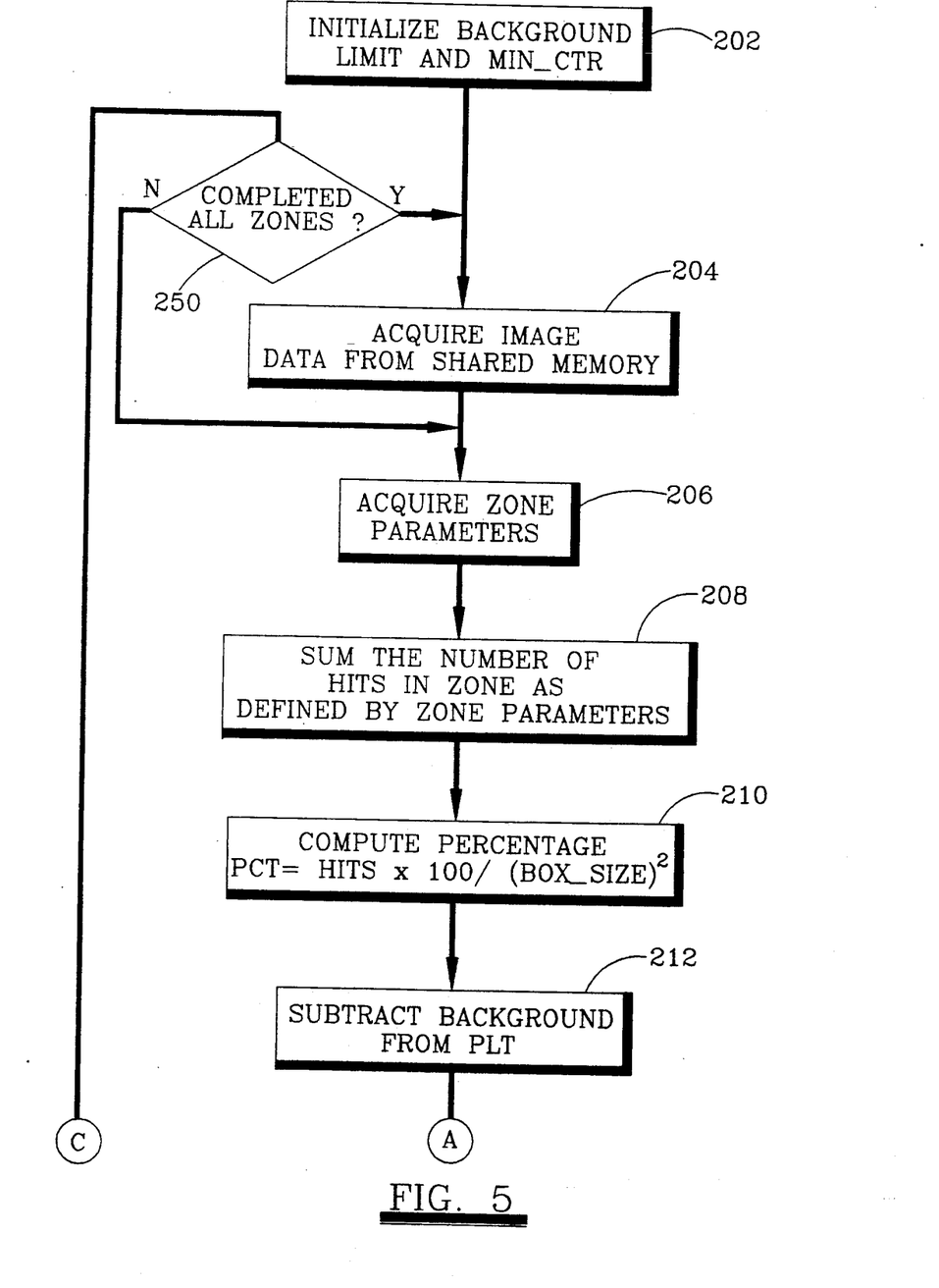
FIGS. 5, 6, and 7 are flowchart diagrams illustrating the image processing techniques used to detect objects in selected zones according to the present invention.
Figure 6:
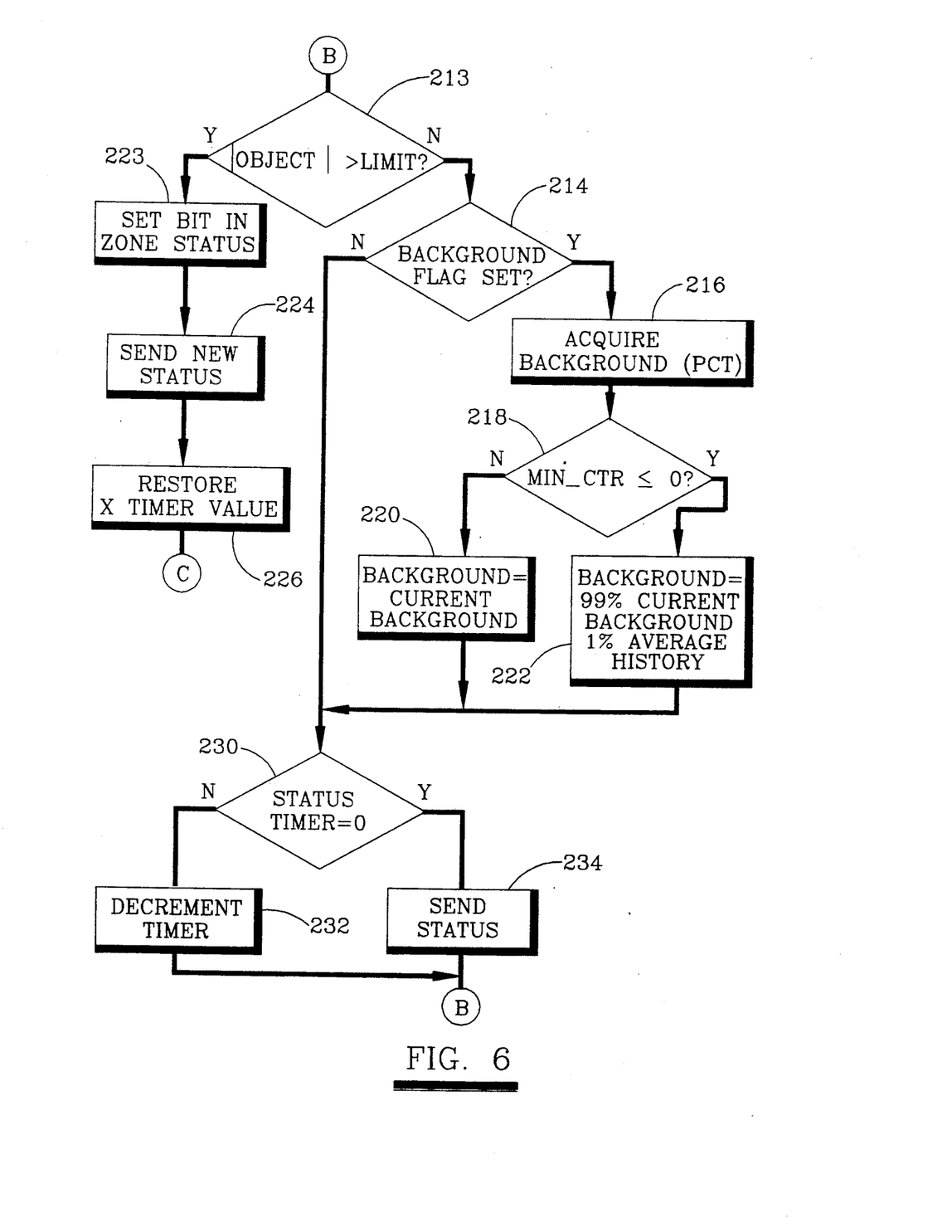
Figure 7:
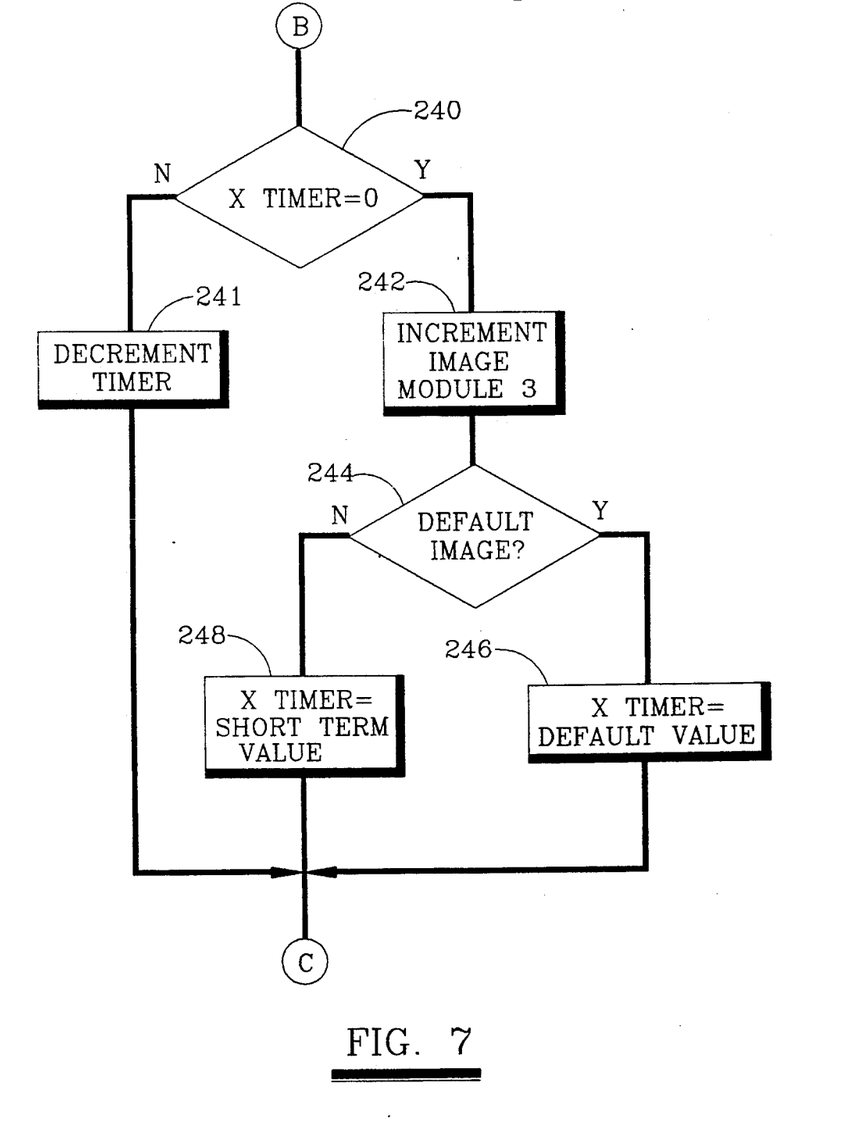

The present invention includes software preferably located in system memory 118 which directs the processor 120 to process the edge extracted image data stored in shared memory 114 to determine if an object has entered into any of the selected zones in the edge extracted image. Referring now to FIGS. 5, 6, and 7, flowchart diagrams illustrating the object detection method according to the present invention are shown. The flowchart is shown in three diagrams with interconnections between the two diagrams designated by reference to the circled letters A, B, and C.

In step 202, a background edge extracted image of the scene being viewed by the sensing element 42 is acquired and stored in system memory 118. The background edge extracted image is a current version of the edge extracted image with no object present. As explained below, the background edge extracted image is continually being updated to ensure that the background reflects the current image seen by the sensing element 42. The processor 120 also computes the percentage of "hits" or one values in the background edge extracted image to arrive at a background edge density value.

The processor 120 also receives input data from a system operator to initialize variables referred to as LIMIT and MIN_CTR in step 202. The value stored in LIMIT is the minimum number of pixel hits required to determine that an object is present within a respective zone of the edge extracted image. The MIN_CTR value initializes a down counter referred to as MIN_CTR, which is used to determine when the background edge extracted image should be updated by a value which includes a time averaged value of the edge extracted image, as is explained below.

In step 204, the system processor 120 acquires an edge extracted image from shared memory 114. Prior to step 204, the image processing logic 52 had placed an edge extracted image of the image being viewed by the sensing element 42 into shared memory 114, as was described above. The respective image acquired by the image processing logic 52 from the CCD grid 90 is initially set to a default image. As explained above, during daylight the default image is image 2, which is the image formed from the visible light spectrum, and during nighttime the default image is image !, which is the image formed from the infrared spectrum. The respective image acquired by the image processing logic 52 can be changed to a non-default image by the processor 120 when no objects are found to be within any of the selected zones after a preset period of time, as is explained below.

The processor 120 then acquires the zone parameters for the first selected zone from system memory 118 in step 206. The zone parameters are input by the system operator, as is explained below. These zone parameters include the variable LIMIT as well as variables referred to as HORIZONTAL, VERTICAL, and BOX_SIZE. If the operator inputs a value for the variable LIMIT, then this value supersedes the LIMIT value initialized by the processor in step 202. The variable HORIZONTAL is used to determine the horizontal or X starting position of the respective zone in the image. Likewise, the variable VERTICAL is used to determine the vertical or Y starting point of the respective zone in the image. The variable BOX_SIZE is used to determine the X and Y length of the zone. Therefore, in this embodiment only square-shaped zones are allowed. However, in another embodiment of the present invention, these zone parameters include two X position variables and two Y position variables which allow any rectangular zone to be selected according to the present invention. In a further embodiment of the present invention, the zone parameters include four sets of X and Y variables to allow any size or shape zone which includes four edges to be selected. In this embodiment, when a zone is selected that is not rectangular in shape, i.e. the chosen X,Y values forming the corners of the zone form edges or lines that are not either completely vertical or horizontal, then the system processor 120 interpolates a line between the X,Y values by choosing pixel locations in the zone that most closely correspond to a straight line between the selected X,Y values. It is further contemplated that any number of X and Y values may be chosen to form any size or shape of zone having any number of edges.

In step 208, the processor 120 sums the number of hits or one values in the respective zone of the edge extracted image in shared memory 114. In step 210, the processor 120 computes the percentage of hits which have occurred in the zone according to the equation:

$$PCT = hits \times 100/(BOX\_SIZE)^2.$$

In step 212, the background edge density value is subtracted from the hit percentage calculated above to arrive at a value referred to as object hit density. The object hit density reflects the density of hits in the zone which may be attributed to an object which possibly entered the zone.

Referring now to FIG. 6, in step 213 the absolute value of the object density value is compared with the value stored in LIMIT to determine whether an object is present. The absolute value of the object density is used because in some instances the background of a zone comprises a number of edges, such as broken pavement, etc. In this instance, the presence of an object in the zone may actually reduce the edge density of the zone. Therefore, the absolute value of the object density is used to account for situations where the background edge density is greater than the edge density when an object is present.

If the absolute value of the object hit density is greater than LIMIT, then the processor 120 sets a status bit in an area of shared memory 114 referred to as zone status (not shown) in step 223 to indicate that an object has been found. In step 224, the status bit of the respective zone is transmitted through the communications processor 62 to the I/O processor 30 to inform the I/O processor 30 that an object is present. The I/O processor 30 receives the status bit signals from each of the selected zones and operates on this information to determine whether the traffic lights 26 should be changed, held, or changed after a delayed period of time, etc., according to the signal control algorithm present in the I/O processor 30. The I/O processor 30 then outputs respective traffic light signals to the respective relay modules 32, 34, 36 or 38, and the energizing of the respective relays in the relay modules 32, 34, 36, and 38 changes the respective traffic lights 26 as desired. The closure of contacts in the respective relays in the relay modules 32, 34, 36, or 38 may also provide information to a traffic control computer (not shown) which preferably counts the number of vehicles passing through the respective zone or generates other desired information. A system operator may also use the traffic control computer to change the traffic light algorithm performed by the I/O processor 30, as desired.

The processor 120 then restores the initial value of a timer referred to as X timer in step 226. Each respective zone in the sensing element's field of vision includes a respective X timer. As explained below, the X timer is a down counter that counts the length of time that no object is determined to be within its respective zone. Therefore, when an object is determined to be within the respective zone in step 213, the X timer is reinitialized to its initial value. The processor 120 also clears a bit referred to as the zone empty bit for the respective zone in step 226. As explained below, each selected zone has an associated zone empty bit which is set in step 244 if no object has been found to be within the respective zone during the X timer period. When the zone empty bits for all of the selected zones are set, then the processor 120 selects a new image to be supplied from the CCD grid 90 to the image processing logic 52. Therefore, when an object is found to be within a respective zone in step 213, then the respective zone empty bit is cleared in step 226 to reflect that the zone has not been empty for the X timer length. The processor 120 then proceeds from step 226 to step 246 (FIG. 7).

If the absolute value of the object hit density is less than that of LIMIT, then no object is determined to be within the zone. In this instance, the respective zone status bit is cleared in step 214, and the processor 120 proceeds to step 215. In step 215 the processor 120 checks a background flag to determine if a counter referred to as the background counter has counted down to zero. The background counter is a down counter which counts a certain length of time and counts independently of the software algorithm currently being discussed. The background counter is used to determine when the edge extracted background being used should be updated with a more recent edge extracted background. In the present embodiment, each selected zone has its own background counter, but the use of a single background counter for all of the zones is also contemplated. The background counter is preferably set to an initial value of between 2 and 10 minutes. When the background counter reaches zero, the background flag is set, and the processor 120 acquires the current value of PCT in step 216 to be used in computing the new edge extracted background for the respective zone. The processor 120 reinitializes the background counter and clears the background flag in step 216.

The processor 120 also uses the PCT value to average into a long running average history of the background hit density in step 216. The long running average history is developed from previous PCT values when the object hit density was determined to be less than LIMIT in step 213. The long running average history is formed by taking a weighted average of 99% of the previous long running average history and 1% of the current background hit density. In the present embodiment, the processor 120 keeps a long running average history of the background hit density of the images formed from each of the portions of the EM spectrum. The long running average history is used in computing the background hit density when MIN_CTR counts down to zero, as is explained below.

In step 218, the processor 120 checks the value of the MIN_CTR counter for the respective zone. In the preferred embodiment, a separate MIN_CTR counter is used for each respective zone. However, in an alternate embodiment, one MIN_CTR counter is used for all of the selected zones. The MIN_CTR counter also counts independently of the software and is preferably set to a period of time between 20 and 40 minutes. If the value of MIN_CTR is greater than zero, then the new background hit density is set equal to the current value of PCT in step 220. If the MIN_CTR value is less than or equal to zero, then in step 222 the background hit density is set to 99% of the current value of PCT (the current background hit density) and 1% of the long-running average history of the background hit density maintained by the processor 120, as described above. The processor 120 also reinitializes MIN_CTR to its initial value in step 222. The processor 120 then proceeds from either step 220 or 222 to step 230 to check the status of a timer referred to as the status timer. If the background flag was not set in step 215, then the processor 120 proceeds directly from step 215 to step 230.

The processor 120 checks the value of the status timer in step 230. In the present embodiment, each respective zone includes an associated status timer. However, in an alternate embodiment, one status timer is included for each respective zone. If the status timer has counted down to zero, signifying that the processor 120 has not recently transmitted the status of the respective zone, then the processor 120 outputs the status data of the zone in step 234 through the communications processor 62 to the I/O processor 30 as described above and resets the timer. If the status timer has not counted down to zero, then the processor 120 decrements the timer in step 232.

Referring now to FIG. 7, the processor 120 then proceeds from either step 232 or 234 to step 240 and checks the status of the X timer. As previously mentioned, the X timer keeps track of the length of time that no object is found to be within a respective zone. If the X timer is not equal to 0 in step 240, then the X timer is decremented in step 242 and the processor 120 proceeds to step 246. If the X timer is equal to 0 in step 240, then the processor proceeds to step 244 where it resets the X timer and sets a zone empty bit for the respective zone. The zone empty bit is set to reflect that no object has been determined to be in the respective zone for the X timer period.

The system processor 120 proceeds to step 246 and determines if it has examined all of the selected zones in the image. If the processor 120 has not completed all of the zones in the respective image, then the processor 120 returns to step 206 (FIG. 5) and acquires the zone parameters for the next respective zone, as shown by the interconnection D. If the processor 120 has completed all of the zones in the image in step 246, then the processor proceeds to step 248 and determines if all of the selected zones are empty by checking the zone empty bits for each of the selected zones. If all of the zones are determined to be empty in step 248, then the respective image output from the CCD grid 90 to the image processing logic 52 is incremented module 3 in step 250. If the image used in the analysis above was image 1, then the image is incremented to image 2; if the image being used was image 2, then the image is incremented to image 3, and if the image being used was image 3, then the image is incremented to image 1.

In step 252, if the new image that is to be used is the default image, which during daylight is image 2 and during nighttime is image 1, then the X timer for each of the selected zones is set to a default value in step 254. If the new image that is to be used is not the default image, then the X timer for each of the zones is set to a short term value in step 256. The X timer for each of the zones is set to a short term value when non-default images are to be used to provide the MVS 22 with an opportunity to use the non-default images to determine if an object is present within the respective zone. The non-default images are generally used when weather conditions are such that the default image is not the most effective image for the detection or recognition of objects. If the X timers for each of the selected zones count down without an object having been found in any of the zones while non-default images are being used, then the method eventually returns to the default image. If an object is detected in any of the respective zones using one of the non-default images, then the respective non-default image is used until the situation arises where no object is found in any of the selected zones during the X timer period. After either steps 254 or 256, or if all of the zones were determined not to be empty in step 248, the processor 120 advances to step 204 (FIG. 5) and acquires another edge extracted image from shared memory 114.

Therefore, the processor 120 acquires a new edge extracted image from the shared memory 114 if it has completed all of the zones in the respective image. The edge extracted image placed in shared memory 114 may be derived from an image produced from a different portion of the EM spectrum depending on whether the image value was changed in step 250. This process then repeats itself continuously with the processor 120 acquiring edge extracted images from the shared memory 114, determining if an object is present in each of the zones, and then transmitting the status of the various zones to respective relay modules 32, 34, 36 and 38.

In another embodiment of the present invention, the processor 120 compares the current background edge density value with the long running average history to determine if any degradation in the image seen by the sensing element 42 is occurring. If the current background edge density is less than the long running average history edge density by a certain amount, then the processor 120 uses a non-default image and compares the background edge density of the non-default image with that of the default image. If the background edge density of the non-default image is greater than that of the default image by a certain amount, then the non-default image is substituted for the default image as the image to be used.

In an alternate embodiment of the present invention, the processor 120 performs image recognition techniques on the edge extracted image stored in shared memory 114. In this embodiment, the system memory 118 includes edge extracted images of objects that are to be recognized. The object images are compared against the edge extracted images stored in shared memory 114 using standard image processing techniques. The object image that most closely matches the edge extracted image stored in shared memory 114 is determined to be the object present in the respective zone. The system processor 120 then generates object data that is passed through the communications processor 62 to the I/O processor 30. The I/O processor 30 receives this object data and generates data to close the appropriate relays in the respective relay modules 32, 34, 36, and 38, which communicates information regarding the type of object to the remote traffic control computer, which records this information for later analysis. The closure of the respective relays also changes the traffic lights 26, as necessary.

The present invention includes software which enables a system operator to use the remote input computer 64 (FIG. 2) to program the image processors 52, 54, 56, and 58 with the respective parameter data to enable the image processors 52, 54, 56, and 58 to operate on selected zones in the respective edge extracted images, as desired.

Figure 8:
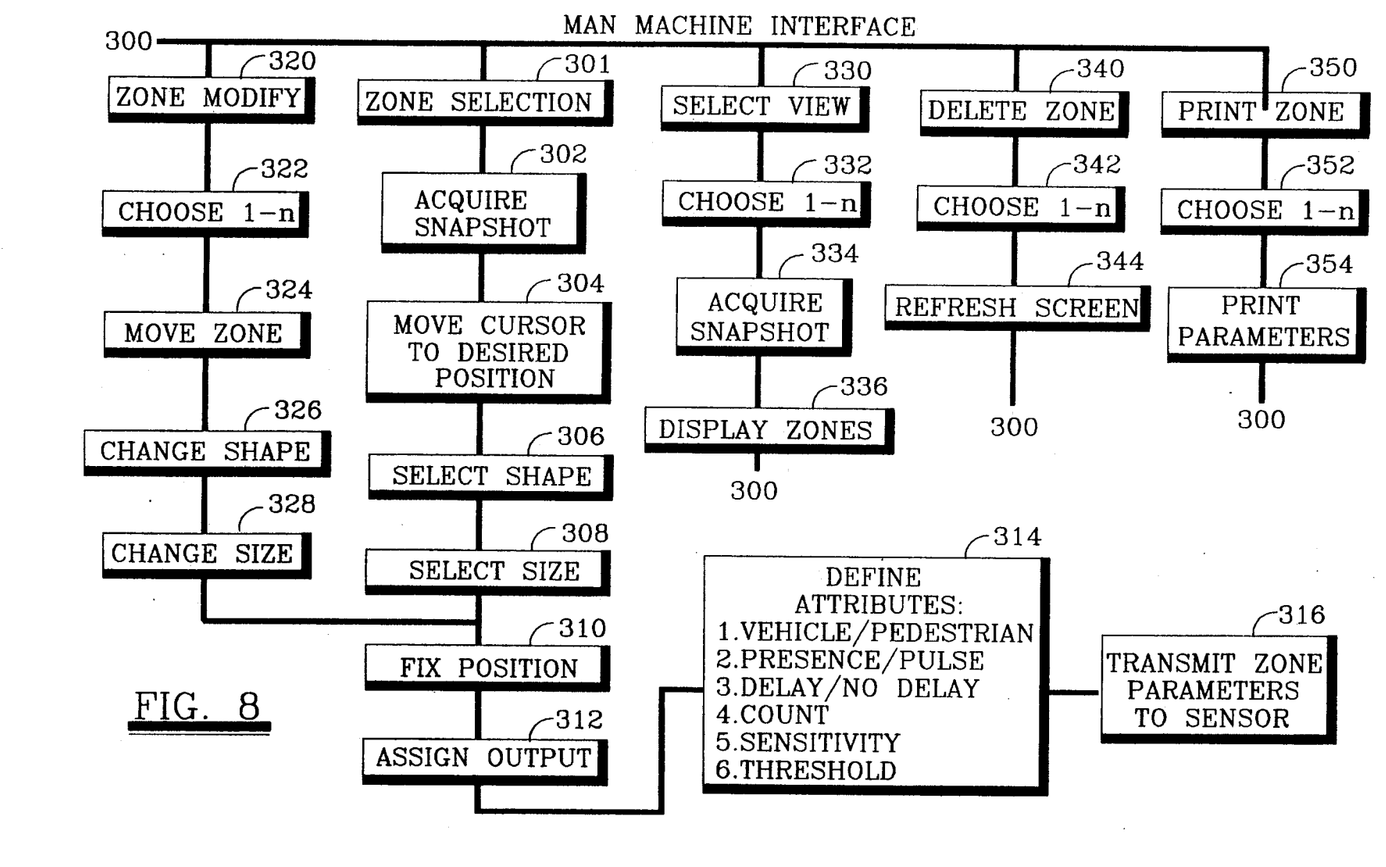
FIG. 8 is a flowchart diagram illustrating zone selection according to the present invention.

Referring now to FIG. 8, a block diagram of the options available to an operator in programming one of the respective image processors 52, 54, 56, and 58 is shown. An operator begins at step 300 where he selects the image processor/sensing element pair to program. In step 301 the computer 64 displays the view seen by the respective sensing element chosen by the operator. In the following discussion, it is assumed that the operator has chosen the sensing element 42, and the computer 64 is displaying the view seen by the sensing element 42 and any respective zones that have been selected by the operator.

The operator may choose to perform a zone selection in step 302. When performing a zone selection in step 302, the operator moves the cursor to the desired position in the image in step 304 and selects the shape and size of the desired zone in steps 306 and 308. When the operator has completed selecting the zone, he fixes the position of the zone in step 310. The selection of a zone involves the computer 64 using the various selected positions of the cursor on the screen to determine the variables HORIZONTAL, VERTICAL, and BOX_SIZE. Since a determination of these variables by a computer through the position of a cursor on the screen is well known to those skilled in the art, details of its implementation have been omitted for simplicity. As previously mentioned, in an alternate embodiment of the present invention, an operator may use the cursor to select a zone of any size and shape, and the computer 64 translates the selected shape, size, and position into four corresponding horizontal and vertical variables.

The operator then assigns an output type for the respective zone in step 312. The type of output desired for a respective zone may be either simply a yes/no signal determining if an object was detected, or, in the alternate embodiment described above where image recognition is being performed, the output is a bit stream representing the particular object present in the respective zone.

The operator then defines attributes of the zone in step 314. When image recognition is being performed, one attribute that is preferably defined is the type of respective object images in system memory !18 that will be compared against the edge extracted image in shared memory 114. In this alternate embodiment where image recognition is being performed, two different sets of object images are stored in system memory 118, these being vehicle images such as cars, trucks, etc., and pedestrian images. An operator preferably selects between these two sets of object images to be compared against the edge extracted image formed from the respective zone as seen by the sensing element 42. The selection between the two sets of object images depends on whether the respective zone in the sensing element's field of view is trained on a roadway and the operator desires to distinguish between vehicles, or whether the respective zone is trained on a crosswalk or other pedestrian area and the operator wishes to distinguish between pedestrians, bicycles, etc.

The operator also determines whether the output of the communications processor 62 is to be a presence signal, which is asserted during the time that an object is present within the respective zone, or a signal pulse, which is asserted when an object enters and/or leaves the zone. The use of the signal pulse is desirable when a count of the number of vehicles passing through a respective zone is desired. The operator also selects whether a delay should be inserted before the respective image processing logic informs the I/O processor that a vehicle has left a respective zone. This delay feature has the effect of indicating that a vehicle is still present in the zone for a certain period of time after a vehicle has actually left the respective zone, and it is intended for lengthening the green light period for intersections which require a vehicle to be exposed in the middle of the intersection for an unusually long period of time, such as left turns under freeways, etc. If a delay is desired, the operator preferably selects the length of delay using the count selection in 4. In 5, the operator selects the sensitivity of the object detection, which is the value for the variable LIMIT. As described above, the LIMIT value is compared against the object density value to determine if an object has entered a respective zone. The operator also selects the desired threshold value that will be provided to the magnitude latch 110 when the respective zone is being processed by the image processing logic 52. In general, the background view seen by the sensing element 42 varies between the different selected zones. This feature enables the operator to select different threshold values for selected zones that account for the different backgrounds present in the respective zones, thus allowing more efficient detection to be performed. In step 316, the input computer 64 transmits these zone parameters to the respective image processor 52, and the operator returns to step 301.

An operator may also choose to modify a zone that has already been selected in the image. In step 320, the operator selects the zone modify function and in step 322 chooses any of the respective zones 1 through n in the sensing element's field of view. The operator then may either move the zone, change the shape of the zone, or change the size of the zone, in steps 324, 326 and 328, respectively. The changes affected in the zone are accomplished by using the cursor to change the respective values of the zone parameters for the respective zone. The operator then fixes the position of the new zone in step 310, assigns the appropriate output in step 312, defines new attributes, if desired, in step 314, and transmits the new zone parameters in step 316, as was described above.

An operator may also choose to view the background image seen in one of the respective zones selected in the sensing element's field of view in step 330. This method involves choosing one of the respective zones in step 332 and acquiring a snapshot or picture of the respective zone as seen from the sensing element 42 in step 334. The snapshot is acquired by transmitting the edge extracted image as seen in the respective zone from shared memory 114 through the communications processor 62 to the I/O processor 30 and then to the remote input computer 64. The system processor 120 is capable of transmitting only the image information for the respective zone because it keeps track of the pixel addresses which correspond to the pixels which beside in the respective zone. Once the operator is finished viewing the image in the respective zone, the computer 64 again displays all of the various zones selected in the sensing element's field of view in step 336 and then returns to step 301.

An operator may also choose to delete a respective zone in the sensing element's field of view by selecting the delete zone command in step 340 and then choosing the desired zone(s) to be deleted in step 342. When the operator has completed, the computer screen is then refreshed in step 344 with the sensing element's field of view and with the undeleted zones appearing, and the process returns to step 301.

An operator may also print one of the respective zones in the image in step 350. This process involves selecting one of the respective zones in step 352 to be printed. The operator may also print the respective parameters of the zone in step 354 before returning to step 301. Additionally, an operator may choose to program a different sensing element/image processing pair in step 300 after step 301.

Therefore, the present invention comprises a machine vision system which uses images formed from different portions of the frequency spectrum to detect or recognize objects. The machine vision system according to the present invention also includes a method and apparatus which enables an operator to select various zones within the camera's or sensing element's field of view, and the detection system performs image detection and recognition only in the selected zones. The invention also enables an operator to select different parameters for each of the zones that depend on the background in the respective zone. The machine vision detection system according to the present invention is also comprised of a single apparatus that is relatively small and therefore can be more conveniently placed and used in the field.

The foregoing disclosure and description of the invention are illustrative and explanatory thereof, and various changes in the size, shape, materials, components, circuit elements, wiring connections, and contacts, as well as in the details of the illustrated circuitry and construction may be made without departing from the spirit of the invention.

We claim:

1. A traffic surveillance system for detecting the presence of vehicles and for generating signals for operating a traffic light, comprising:

means for receiving electromagnetic wavelengths of varying frequencies from the vehicle;

a plurality of filter means for receiving said electromagnetic wavelengths from said receiving means and passing portions of said electromagnetic wavelengths according to said varying frequencies in the electromagnetic spectrum, each filter means passing a different portion of the electromagnetic spectrum;

means receiving the electromagnetic wavelengths passed by said plurality of filter means for translating said portions of said electromagnetic wavelengths passed by said filter means into a corresponding plurality of images;

means coupled to said translating means for selecting one of said images formed from said portions of said electromagnetic wavelength as a function of varying detectability conditions;

image processing means coupled to said selecting means which uses said selected image to determine if a vehicle is present and generates a signal indicative thereof; and means coupled to said image processing means for receiving said indicating signal and for changing the traffic light according to said signal.

2. The traffic surveillance system of claim 1, wherein said selecting means includes:

clocking means for differentiating between daytime and nighttime, and wherein said selecting means selects a default image from, a first portion of said electromagnetic wavelengths during daytime and a default image from a second portion of said electromagnetic wavelengths during nighttime.

3. The traffic surveillance system of claim 2, wherein said selecting means further includes:
   clocking means coupled to said image processing means for measuring a first length of time when no vehicle is present; and
   means coupled to said clocking means for changing to an image other than said default image when said first length of time has expired.

4. The traffic surveillance system of claim 3, wherein said selecting means further includes:
   clocking means coupled to said image processing means for measuring a second length of time that no vehicle is present when said selecting means has selected said non-default image; and
   means coupled to said clocking means for returning to said default image when said second length of time has expired.

5. The traffic surveillance system of claim 4, wherein said first length of time is greater than said second length of time.

6. The traffic surveillance system of claim 2, wherein said image processing means includes a means for generating edge density values from said default images; and
   wherein said selecting means includes:
   means for generating a running average of said default image edge density value;
   means coupled to said generating means for comparing said running average edge density value with said default image edge density value; and
   means coupled to said comparing means for selecting an image other than said default image when said default image edge density value is less than said running average edge density value by a predetermined amount.

7. The traffic surveillance system of claim 1, wherein each of said filter means comprises a bandpass filter.

8. The traffic surveillance system of claim 7, wherein said bandpass filters include bandpass filters operating at the visible light spectrum, the ultraviolet spectrum, and the infrared spectrum.

9. A machine vision system for detecting and recognizing objects, comprising:
   means for receiving electromagnetic radiation from the object;
   a plurality of filter means receiving said electromagnetic radiation from said receiving means and passing portions of said electromagnetic radiation according to frequencies in the electromagnetic spectrum, each filter means passing a different portion of the electromagnetic spectrum;
   means for translating said portions of said electromagnetic radiation passed by said filter means into a corresponding plurality of images;
   storing means for storing reference object images; and
   image processing means coupled to said translating means which compares portions of one of said images with said reference object images to determine if an object is present and generates signals indicative of which of said reference object images most closely matches said portion of said image.

10. A traffic surveillance system for detecting the presence of vehicles, comprising:
    means for receiving electromagnetic wavelengths of varying frequencies from the vehicle, wherein said receiving means has a field of view;
    image processing means coupled to said translating means to determine if a vehicle is present in said field of view, said image processing means including:
    (a) means for converting said image into a digital image comprising a plurality of pixels having associated values;
    (b) latching means for storing a threshold value;
    (c) comparator means coupled to said converting means and said latching means for comparing said threshold value with said associated values of each of said pixels and generating a signal value indicating thereof;
    (d) means coupled to said comparator means for storing each of said comparator means signal value for each pixel; and
    (e) means coupled to said storing means for receiving said stored comparator means signal values and generating an image edge density value representing the percentage of said comparator means signal values greater than said threshold value.

11. The traffic surveillance system of claim 10, wherein said image processing means further includes:
    means for receiving said image edge density valve and for determining information therefrom regarding the presence of a vehicle in said field of view.

12. The traffic surveillance system of claim 11, further comprising selection means for selecting said threshold value for each of multiple zones in said field of view.

13. The traffic surveillance system of claim 12, further comprising:
    control means for selecting a rectangular-shaped zone for each of said multiple zones in said field of view.

14. The traffic surveillance system of claim 11, wherein said comparator means signal has a first value if said pixel value if greater than said threshold value and said comparator means signal has a second value if said pixel value is less than said threshold value; and
    wherein said image processing means further includes:
    background means coupled to said storing means for generating an edge density value representing the percentage of said comparator means signal values having said first value when no vehicle is present in said field of view;
    subtracting means coupled to said image edge density value means and said background means for subtracting said background edge density value from said image edge density value and generating an object edge density value; and
    comparing means coupled to said subtracting means for comparing said object edge density value with a limit value and generating a signal indicative thereof.

15. The traffic surveillance system of claim 14, further comprising selecting means for selecting said limit value for each of multiple zones in said field of view.

16. A machine vision system for detecting the presence of objects, comprising:
    means for receiving electromagnetic wavelengths of varying frequencies from the object;

a plurality of filter means for receiving said electromagnetic wavelengths from said receiving means and passing portions of said electromagnetic wavelengths according to said varying frequencies in the electromagnetic spectrum, each filter means passing a different portion of the electromagnetic spectrum;

means receiving the electromagnetic wavelengts passed by said plurality of filter means for translating said portions of said electromagnetic radiation passed by said filter means into a corresponding plurality of images;

means coupled to said translating means for selecting one of said images formed from said portions of said electromagnetic wavelengths as a function of varying detectability conditions; and image processing means coupled to said selecting means which uses said selected image to determine if an object is present and generates a signal indicative thereof.

17. The machine vision system of claim 16, wherein said selecting means includes:

clocking means for differentiating between daytime and nighttime, and wherein said selecting means selects a default image from a first portion of said electromagnetic wavelength during daytime and a default image from a second portion of said electromagnetic wavelength during nighttime.

18. The machine vision system of claim 17, wherein said selecting means further includes:

clocking means coupled to said image processing means for measuring a first length of time that no object is present; and means coupled to said clocking means for changing to an image other than said default image when said first length of time has expired.

19. The machine vision system of claim 18, wherein said selecting means further includes:

clocking means coupled to said image processing means for measuring a second length of time that no object is present when said selecting means has selected said non-default image; and means coupled to said clocking means for returning to said default image when said second length of time has expired.

20. The machine vision system of claim 19, wherein said first length of time is greater than said second length of time.

21. The machine vision system of claim 17, wherein said image processing means includes a means for generating edge density values from said default images; and wherein said selecting means includes:

means for generating a running average of said default image edge density value;

means coupled to said generating means for comparing said running average edge density value with said default image edge density value; and means coupled to said comparing means for selecting an image other than said default image when said default image edge density value is less than said running average edge density value by a predetermined amount.

22. The machine vision system of claim 16, wherein each of said filter means comprises a bandpass filter.

23. The machine vision system of claim 22, wherein said bandpass filters include bandpass filters operating at the visible light spectrum, the ultraviolet spectrum, and the infrared spectrum.

24. A machine vision system for detecting and recognizing objects, comprising:

means for receiving electromagnetic wavelengths of varying frequencies from the object;

a plurality of filters receiving said electromagnetic wavelengths from said receiving means and each passing a portion of said electromagnetic wavelengths as a function of the frequency of the electromagnetic spectrum;

means for translating portions of said electromagnetic wavelengths into a corresponding plurality of images;

storing means for storing multiple reference object images; and imaging processing means coupled to said translating means which compares at least one of said plurality of images with said reference object images to determine if an object is present and generates signals indicative of which of said multiple reference object images most closely matches said at least one of said plurality of images.

25. The machine vision system of claim 24, further comprising:

selecting means for selecting one of the plurality of images passed through a respective one of the filters as a function of varying detectability conditions.

26. The machine vision system of claim 25, wherein the selecting means comprising:

clocking means for differentiating between daytime and nighttime; and wherein said selecting means selects a default image from a first portion of said electromagnetic wavelengths during daytime and a default image from a second portion of said electromagnetic wavelengths during nighttime.

27. The machine vision system of claim 26, wherein said selecting means further includes:

clocking means coupled to said image processing means for measuring a first length of time when no vehicle is present; and means coupled to said clocking means for changing to an image other than said default image when said first length of time has expired.

28. The machine vision system of claim 27, wherein said selecting means further includes:

clocking means coupled to said image processing means for measuring a second length of time when no vehicle is present when said selecting means has selected said non-default image; and means coupled to said clocking means for returning to said default image when said second length of time has expired.

29. The machine vision system of claim 28, wherein said first length of time is greater than said second length of time.

30. The machine vision system of claim 26, further comprising:

said image processing means includes a means for generating edge density value from said default images; and wherein said selecting means includes:

means for generating a running average of said default image edge density value;

means coupled to said generating means for comparing said running average edge density value with said default image edge density value; and means coupled to said comparing means for selecting an image other than said default image when said default image edge density value is less than said running average edge density value by a predetermined amount.

31. The machine vision system of claim 24, further comprising:

said means for receiving electromagnetic wavelengths has a field of view; and control means for selecting a plurality of zones within said field of view, each of said plurality of zones being a rectangular-shaped zone.

* * * * *